W. T. UHL.
AUTOMATIC WATER CONTROL FOR CUSPIDORS.
APPLICATION FILED APR. 3, 1916.

1,245,406.

Patented Nov. 6, 1917.

Witness:
Louis W. Gratz.

Inventor
William T. Uhl.
by Townsend, Graham & Harris
his Attorneys.

UNITED STATES PATENT OFFICE.

WILLIAM T. UHL, OF LOS ANGELES, CALIFORNIA.

AUTOMATIC WATER CONTROL FOR CUSPIDORS.

1,245,406.      Specification of Letters Patent.      Patented Nov. 6, 1917.

Application filed April 3, 1916. Serial No. 88,741.

*To all whom it may concern:*

Be it known that I, WILLIAM T. UHL, a citizen of the United States, residing at Los Angeles, in the county of Los Angeles, State of California, have invented a new and useful Automatic Water Control for Cuspidors, of which the following is a specification.

My invention relates to dental chairs, and the principal object of the invention is to provide means for normally shutting off the supply of water to the cuspidor commonly supplied with dental chairs and to provide means whereby the weight of the patient in the chair starts the water running, the water being again shut off whenever the patient leaves the chair.

Further objects and advantages will be evident hereinafter.

Referring to the drawings, which are for illustrative purposes only:

Figure 1:
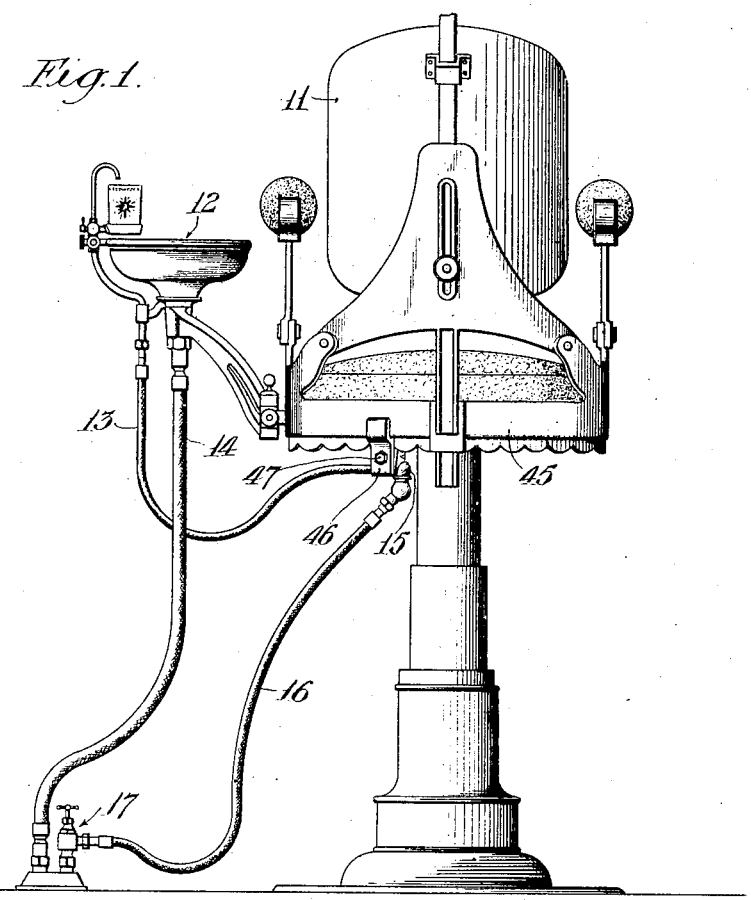
Figure 1 is a rear view of a dental chair equipped with a dental cuspidor and with my invention.
Figure 2:
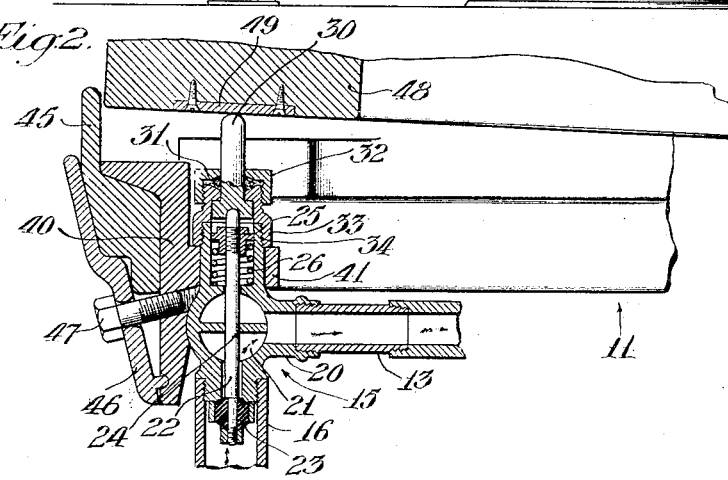
Fig. 2 is a sectional view of the control valve of my invention and a portion of a dental chair.

In the form of my invention illustrated in the drawings a dental chair 11 is provided with a cuspidor 12, this cuspidor being fed through a flexible hose 13, the waste water thereof being discharged through a waste pipe 14.

In my invention I provide a valve 15 which normally closes the pipe 13, the valve when open providing an open communication between the pipe 13 and a pipe 16 which extends down and connects through a bib cock 17 with the source of water supply. The valve 15 consists of a body 20 to which is secured the pipes 16 and 13, the pipe 13 being in open communication at all times with a central opening 21 formed in the valve body 20 and the pipe 16 being in communication with the opening 21 through an opening 22 which is normally closed by a valve 23. The valve 23 is provided with a stem 24 on which a nut 25 is placed, a compression spring 26 pressing on the nut 25 and holding the valve 23 tightly against its seat thereby preventing communication between the pipe 16 and the chamber 21 through the opening 22.

A pressure pin 30 passes through packing 31 which is compressed therearound by a packing nut 32, the packing nut 32 being threaded on a nut 33 secured at 34 to the valve body 20. The valve body 20 is secured in a support 40, the valve body passing upwardly through a ring 41 formed thereon and being clamped thereto by means of the nut 33. The support 40 is secured to the rim 45 of the chair 11 by means of a clamp 46 and a clamping bolt 47. The seat of the chair 48 normally rests inside the rim 45 and a metal plate 49 is secured thereto in such a position that the seat rests against the end of the pressure stem 30, the spring 26 being made of sufficient strength to hold the seat 48 in its upper position except when pressed downwardly by the weight of the patient.

The method of operation of the invention is as follows: The parts being in the position shown in the drawings the flow of water between the pipes 16 and 13 is entirely shut off by the valve 23 which closes the opening 22 through which the water must flow. There is therefore no water supplied to the cuspidor. Whenever a patient sits in the chair the weight of the patient on the seat presses downwardly on the pressure stem 30, the pressure stem pressing downwardly on the valve stem 24, this valve stem in turn separating the valve 23 from its seat and allowing water to flow freely through the opening 22, thus providing an open communication between the pipes 13 and 15.

By the use of my invention water is not wasted due to dentists allowing water to run continually in the cuspidor.

I claim as my invention:

1. An automatic water control for dental cuspidor adapted to be used with a standard dental chair comprising a water control valve in the supply pipe to the cuspidor, means for holding said valve closed thus shutting off the flow of water through said supply pipe, and means whereby said valve is automatically held open while a patient is in the chair.

2. An automatic water control for dental cuspidor adapted to be used with a standard dental chair comprising a water control valve in the supply pipe to the cuspidor, a spring for normally holding said valve closed, and means whereby said valve is automatically held open while a patient is in the chair.

3. The combination of a dental chair, a loose seat for said chair, a cuspidor for said chair, a cuspidor supply pipe for feeding water to said cuspidor, a valve for regulating the flow of water through said cuspidor supply pipe, means for normally holding said valve closed, and means whereby the weight of a patient on said loose seat opens said valve.

4. The combination of a dental chair, a loose seat for said chair, a cuspidor for said chair, a cuspidor supply pipe for feeding water to said cuspidor, a valve body clamped rigidly to the frame of said chair and having a central opening formed therein, means for connecting said cuspidor supply pipe to said valve body in such a manner that water can flow freely from said central opening into said cuspidor supply pipe, a valve for controlling the flow of water into said central opening, spring means for normally holding said valve in the closed position, and means whereby the weight of the patient in the chair opens the valve.

5. The combination of a dental chair, a loose seat for said chair, a cuspidor for said chair, a cuspidor supply pipe for feeding water to said cuspidor, a valve body clamped rigidly to the frame of said chair and having a central opening formed therein, means for connecting said cuspidor supply pipe to said valve body in such a manner that water can flow freely from said central opening into said cuspidor supply pipe, a valve water supply pipe connected to said valve body in such a manner as to feed water through an orifice into said central opening in said valve body, a valve located below said orifice and adapted when forced upwardly to close the opening through said orifice, a valve stem projecting upwardly through said orifice, spring means for forcing said valve stem upwardly, and means by which the weight of the patient in the chair forces the valve stem downwardly.

In testimony whereof, I have hereunto set my hand at Los Angeles, California, this 19th day of April, 1915.

WILLIAM T. UHL.

Copies of this patent may be obtained for five cents each, by addressing the "Commissioner of Patents, Washington, D. C."